United States Patent
Scully et al.

(10) Patent No.: US 7,300,484 B2
(45) Date of Patent: Nov. 27, 2007

(54) BLOWER HAVING A CARRYING FRAME

(75) Inventors: Randy Scully, Moycock, NC (US); Jim Herrala, Windsor, VA (US)

(73) Assignee: Andreas Stihl AG & Co. KG, Waiblingen (DE)

(*) Notice: Subject to any disclaimer, the term of this patent is extended or adjusted under 35 U.S.C. 154(b) by 351 days.

(21) Appl. No.: 10/711,417

(22) Filed: Sep. 17, 2004

(65) Prior Publication Data
US 2006/0059873 A1    Mar. 23, 2006

(51) Int. Cl.
*A47L 5/11* (2006.01)
*A47L 5/36* (2006.01)

(52) U.S. Cl. .......................... 55/385.1; 55/487; 55/505; 55/507; 55/523; 15/327.5; 15/405; 123/41.49; 123/198 E; 180/68.1; 180/84; 34/82; 34/97; 392/385

(58) Field of Classification Search ............... 55/385.1, 55/487, 505, 507, 523; 15/327.5, 405; 123/41.49, 123/198 E; 180/68.1, 84; 34/82, 97; 392/385
See application file for complete search history.

(56) References Cited

U.S. PATENT DOCUMENTS

| | | | | |
|---|---|---|---|---|
| 4,758,460 A | * | 7/1988 | Spicer et al. ............... | 428/159 |
| 5,133,315 A | * | 7/1992 | Reese ..................... | 123/198 E |
| 5,167,209 A | * | 12/1992 | Dufern et al. ........... | 123/198 E |
| 5,490,336 A | * | 2/1996 | Smick et al. ................ | 34/97 |
| 6,068,675 A | * | 5/2000 | Tsuda et al. ............... | 55/385.3 |
| 6,361,590 B1 | * | 3/2002 | Gilbert et al. ............... | 96/384 |
| 2002/0174511 A1 | | 11/2002 | Iida et al. | |
| 2006/0080949 A1 | * | 4/2006 | Moriyama et al. ........... | 55/490 |
| 2006/0169256 A1 | * | 8/2006 | Lavender et al. ........ | 123/559.1 |

* cited by examiner

*Primary Examiner*—Duane Smith
*Assistant Examiner*—Minh-Chau T. Pham
(74) *Attorney, Agent, or Firm*—Gudrun E. Huckett

(57) ABSTRACT

A blower has a carrying frame provided with a base plate. A fan with a fan housing is mounted on the carrying frame. The fan housing has an intake opening that faces the base plate and is spaced from the base plate. An intake gap is formed between the base plate and the fan housing. An internal combustion engine drives the fan in order to take in working air through the intake opening and to blow out the working air through a blower tube. A leaf shield for preventing leaves and debris from entering the fan housing is provided and covers the intake gap. The leaf shield is made of a foam material having coarse pores to allow unimpaired intake of the working air and to prevent leaves or other debris from adhering to the leaf shield.

6 Claims, 2 Drawing Sheets

BLOWER HAVING A CARRYING FRAME

BACKGROUND OF THE INVENTION

The invention relates to a blower, in particular, a backpack blower, comprising a carrying frame provided with a base plate, wherein a fan comprising a fan housing is mounted on the carrying frame. The fan housing has an intake opening that faces the base plate and is spaced from the base plate. The blower comprises furthermore an internal combustion engine for driving the fan in order to take in working air through an intake gap formed between the base plate and the fan housing and to blow out the working air through a blower tube. For preventing leaves and other debris from entering the fan housing, the intake gap is covered by a leaf shield.

Published patent application U.S. 2002/0174511 A1 discloses a blower having an L-shaped carrying frame. The fan arranged within a fan housing that is formed as a fan spiral is driven by an internal combustion engine whose cooling air is branched off the fan spiral. The intake opening of the fan housing is positioned so as to face the base plate and located at such a spacing to the base plate that between the fan housing and the base plate an intake gap for the working air is formed. In order to prevent leaves and similar debris from entering the intake opening of the fan housing, a filter member is provided that is positioned externally annularly about the intake gap and is comprised of a flexible belt material or a wire fabric. This filter member must be mounted externally on the blower which is a cumbersome and complex task. The effective intake cross-section of the intake gap is impaired by the physical configuration of the filter member.

SUMMARY OF THE INVENTION

It is an object of the present invention to provide a leaf shield of a simple configuration that is effective over an extended period of use and provides a protection means to prevent the hands of the hands of the operator from getting caught.

In accordance with the present invention, this is achieved in that the leaf shield is comprised of a foam material having coarse pores.

According to the invention, the leaf shield is thus comprised of a foam material that has a coarse pore structure and is, in particular, an open-pore foam material. The coarse-pore foam material has a plurality of air channels so that the flow resistance of the coarse-pore foam material is minimal. The plurality of air channels allow across the surface of the intake gap a uniform intake of air so that high local intake velocities are prevented. The risk that leaves, or other debris having a large surface area, adhere to the surface of the leaf shield is thus reduced.

Completely filling the intake gap with the coarse-pore foam material also provides a protection means for the operator preventing accidental insertion of hands into the intake gap; additional safety measures are not required.

It can be expedient to provide a mechanical support structure for stabilizing the outer circumference of the leaf shield of coarse-pore foam material.

Preferably, the leaf shield is formed as a monolithic foam material block having a central air chamber that communicates with the intake opening of the fan housing. The monolithic foam material block has excellent stability so that the intake vacuum generated by the fan does not cause collapse of the foam material structure.

Preferably, the central air chamber is a cylindrical opening having a center axis that is approximately perpendicular to the intake direction of the working air. The working air flows from the surroundings approximately radially into the cylindrical air chamber and is deflected in the air chamber in the direction toward the intake opening of the fan housing. The air demand of the fan can be ensured with this arrangement in a reliable way without too high a vacuum being created within the air chamber of the leaf shield.

The leaf shield according to the invention is advantageously secured between the base plates and the fan housing wherein the foam material of the leaf shield fills the entire space between the base plate and the fan housing with the exception of the air chamber. In a simple way, the foam material is clamped (jammed) between the base plate and the fan housing, in particular, with positive fit.

The fastening screws that are provided for attachment of the fan on the support frame are advantageously configured as anti-vibration elements. The fastening screws or anti-vibration elements that connect the base plate and the fan housing to one another penetrate advantageously the foam material of the leaf shield so that in this way the positive fit (positive engagement) is produced. Relative to the circumference of the air chamber, two fastening screws are positioned approximately diametrically opposed to one another so that the dimensional stability of the air chamber is ensured even at high intake vacuum (suction) of the fan. Advantageously, about the circumference of the air chamber several fastening screws are arranged, in particular, four fastening screws, that are positioned at approximately identical circumferential spacing relative to one another.

DESCRIPTION OF THE PREFERRED EMBODIMENTS

Figure 1:
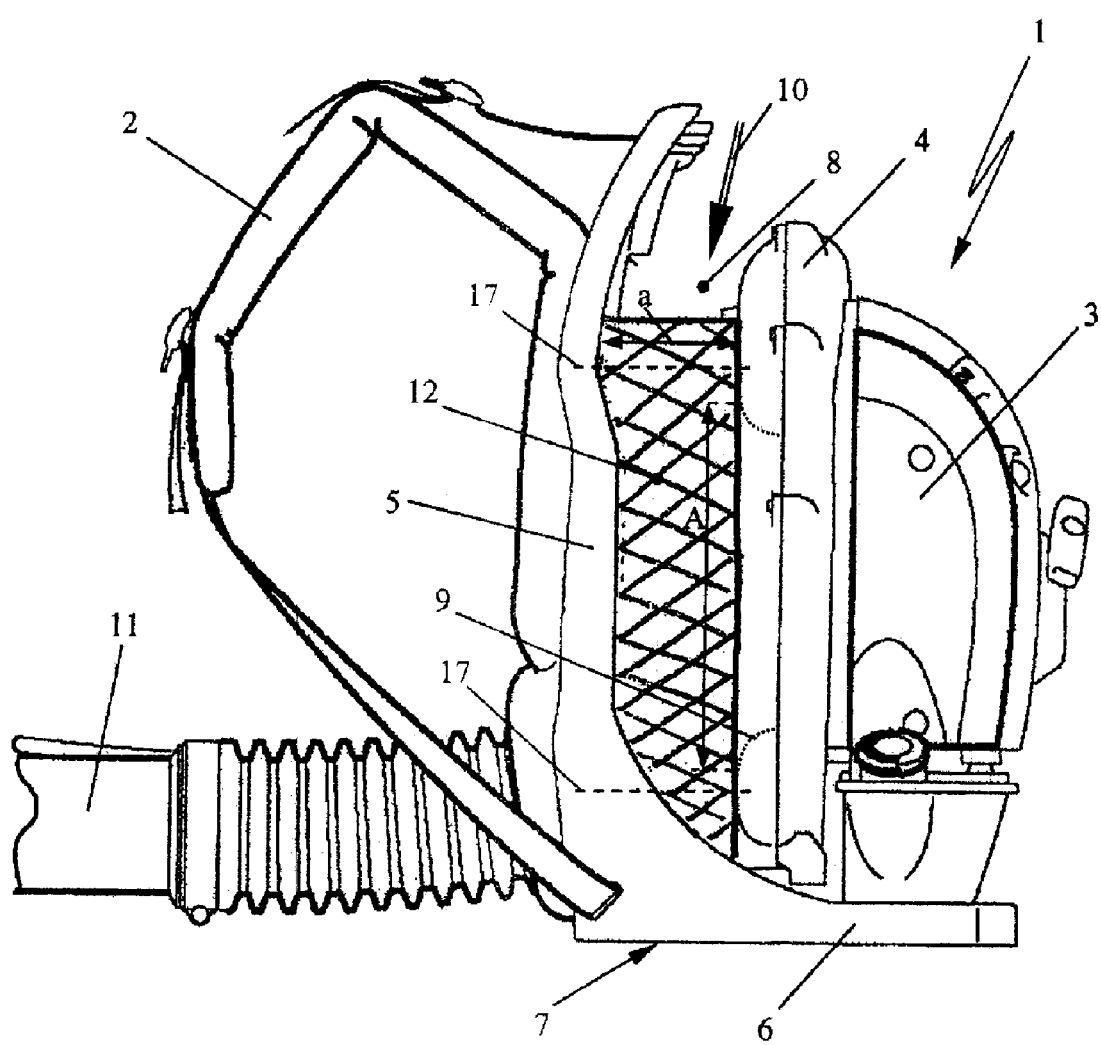
FIG. 1 is a schematic side view of a blower according to the present invention.
Figure 2:
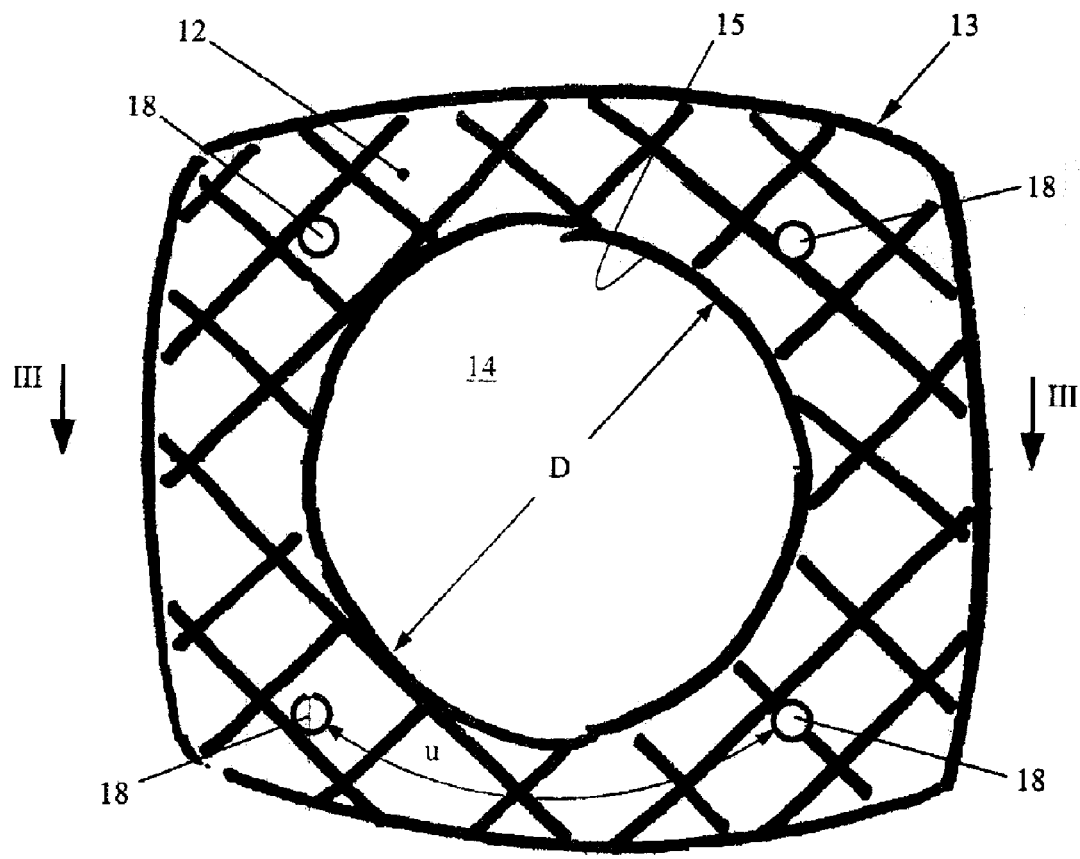
FIG. 2 is a top view of the leaf shield according to the present invention.

The blower 1 illustrated in a side view in FIG. 1 is a backpack blower that can be secured by straps 2 on the back of an operator (not illustrated). Such a blower can also be mounted on a vehicle or carriage or can be used in other ways.

The blower 1 is secured on a carrying frame 7. The carrying frame 7 is comprised of a base plate 5 and a support member 6; the base plate 5 and the support member 6 are arranged relative to one another in the form of an L, as shown in the side view of FIG. 1 of the illustrated embodiment.

The blower 1 has a fan comprising a fan housing 4 formed advantageously as a fan spiral. The fan is driven by a drive motor 3 that is preferably an internal combustion engine, for example, a two-stroke engine or a four-stroke engine.

The fan (fan housing 4) is secured by fastening screws 17, preferably embodied as vibration dampers, on the carrying frame 7. The intake opening 9 of the fan housing 4 is facing the base plate 5 wherein the intake opening 9 has a spacing a relative to the base plate 5. Because of this spacing or distance a between the fan housing 4 and the base plate 5, an intake gap 8 is formed via which working air 10 flows to the intake opening 9 in the blower housing 4, preferably from all sides. The sucked-in working air 10 exits the blower housing 4 via blower tube 11. The blower tube 11 in the illustrated embodiment is guided by the operator carrying the blower.

Since in operation leaves and other debris having a large surface area are swirled into the air in the surroundings of the blower, it must be ensured that no leaves or debris can enter the intake opening 9 of the fan housing 4. Leaves or debris could lead to plugging of the flow path of the working air 10 which, in turn, could lead to cooling problems of the engine when the blower is equipped with an air-cooled combustion engine.

In order to protect the blower from leaves and debris being sucked in, a leaf shield 12 is arranged in the intake gap 8 between the fan housing 4 and the base plate 5. The leaf shield 12 is comprised of a coarse-pore and open-pore foam material. Such foam material is comprised, for example, of polyurethane and fills the flow cross-section of the intake gap completely. Since the coarse-pore, particularly open-pore, foam material has a plurality of flow paths or flow passages as a result of its structure, its flow resistance is minimal. The flow of sucked-in working air 10 is impaired only minimally by the coarse-pore foam material. Accordingly, the flow velocity at the surface of the leaf shield is minimal so that adherence of leaves or other large surface area debris on the surface of the leaf shield by suction forces is counteracted. Because of the coarse-pore structure a sufficient air intake is ensured wherein the leaf shield 12 is preferably configured as a monolithic block of foam material that has an approximately central air chamber 14. The air chamber 14 is arranged such that it is connected directly to the intake opening 9 of the fan housing 4. The foam material block 13 fills—with the exception of the air chamber 14—the entire space between the fan spiral housing 4 and the base plate 5 of the support frame 7.

Figure 3:
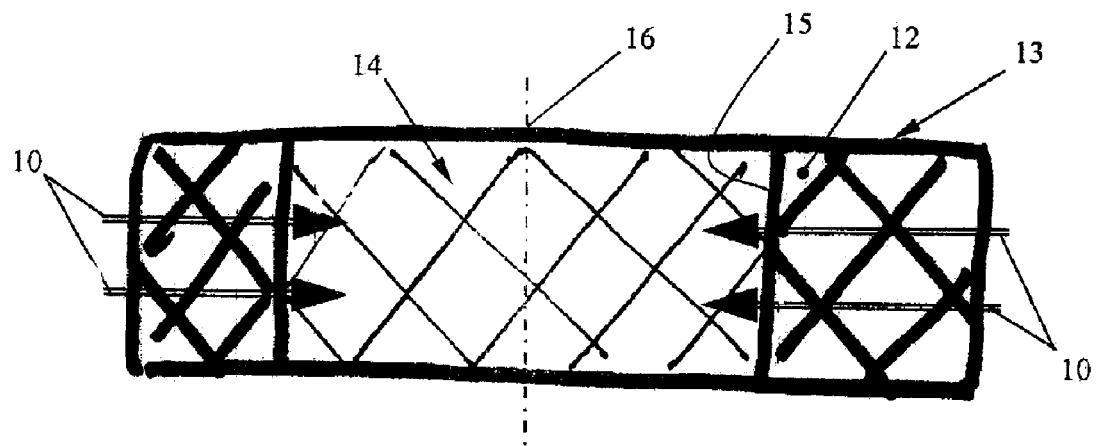
FIG. 3 is section of the leaf shield along the section line III-III of FIG. 2.

The central air chamber 14 is formed as a cylindrical opening 15 having an inner diameter D that matches approximately the intake diameter A of the intake opening 9 in the fan housing. In the illustrated embodiment, the center axis 16 (FIG. 3) of the cylindrical opening 15 is approximately perpendicular to the intake direction of the working air 10. Accordingly, the working air 10 flows approximately radially into the air chamber 14 and changes its flow direction within the air chamber 14 so as to flow toward the intake opening 9.

As mentioned above, the foam material of the leaf shield 12 fills—with the exception of the air chamber—the entire space between the base plate 5 and the fan housing 4. In this connection, the leaf shield 12 is secured between the base plate 5 and the fan housing 4. For example, the foam material can be clamped or jammed between the base plate 5 and the fan housing 4.

In the illustrated embodiment, the foam material is secured with positive fit between the base plate 5 and the fan housing 4. For this purpose, the fastening screws 17 arranged between the base plate 5 and the fan housing 4 penetrate the foam material or the foam material block 13 of the leaf shield 12. Relative to the circumference of the air chamber 14, two fastening screws 17 are positioned diametrically opposed to one another; the foam material block 13 has matching through openings 18 for the fastening screws 17. In the illustrated embodiment four fastening screws 17 are arranged such that they are positioned about the circumference of the air chamber 14 at approximately identical circumferential spacing u relative to one another.

The foam material of the leaf shield 12 is preferably of an open-pore configuration so that the incoming working air 10 experiences as little flow resistance as possible.

While specific embodiments of the invention have been shown and described in detail to illustrate the inventive principles, it will be understood that the invention may be embodied otherwise without departing from such principles.

What is claimed is:

1. A blower comprising:
   a carrying frame provided with a base plate;
   a fan comprising a fan housing mounted on the carrying frame, wherein the fan housing has an intake opening that faces the base plate and is spaced from the base plate and wherein an intake gap is formed between the base plate and the fan housing;
   an internal combustion engine driving the fan in order to take in working air through the intake opening and to blow out the working air through a blower tube;
   a leaf shield for preventing leaves and debris from entering the fan housing, wherein the leaf shield covers the intake gap;
   a protection device preventing accidental insertion of a hand into the intake gap;
   wherein the leaf shield is comprised of a foam material having coarse pores;
   wherein the leaf shield is a monolithic foam material block having a central air chamber adjoining the intake opening of the fan housing, wherein the monolithic foam material block of the leaf shield forms the protection device;
   at least one fastening element arranged between the base plate and the fan housing and connecting the base plate and the fan housing;
   wherein the at least one fastening element penetrates the foam material of the monolithic foam material block and secures by positive fit the monolithic foam material block between the base plate and the fan housing.

2. The blower according to claim 1 configured as a backpack blower.

3. The blower according to claim 1, wherein the foam material is an open-pore foam.

4. The blower according to claim 1, wherein the central air chamber is a cylindrical opening having a center axis positioned substantially perpendicularly to an intake direction of the working air into the intake opening.

5. The blower according to claim 1, wherein two of the at least one fastening element are provided, and wherein said two fastening elements are positioned diametrically opposed to one another relative to a circumference of the air chamber.

6. The blower according to claim 1, wherein several of the at least one fastening element are arranged about a circumference of the air chamber at substantially identical circumferential spacing relative to one another.

* * * * *